H. F. HOLWORTHY.
WHEEL SCOTCH.
APPLICATION FILED NOV. 9, 1912.
1,082,807.
Patented Dec. 30, 1913.
2 SHEETS—SHEET 2.
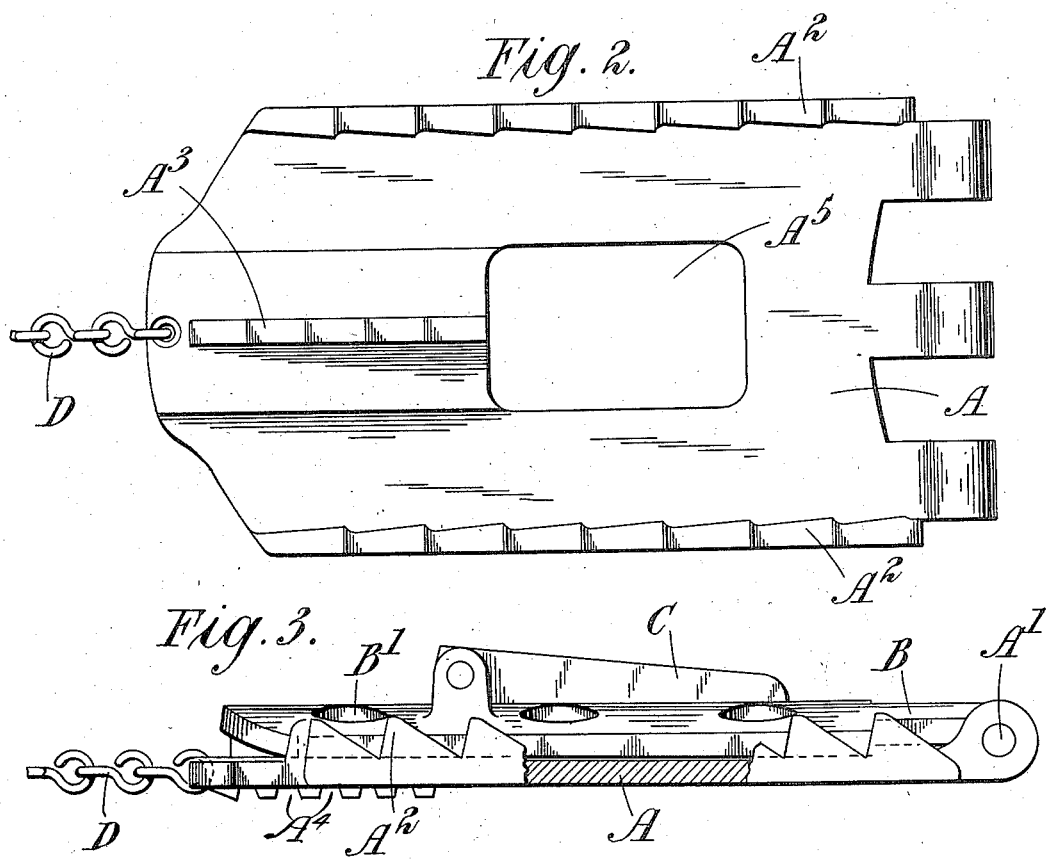

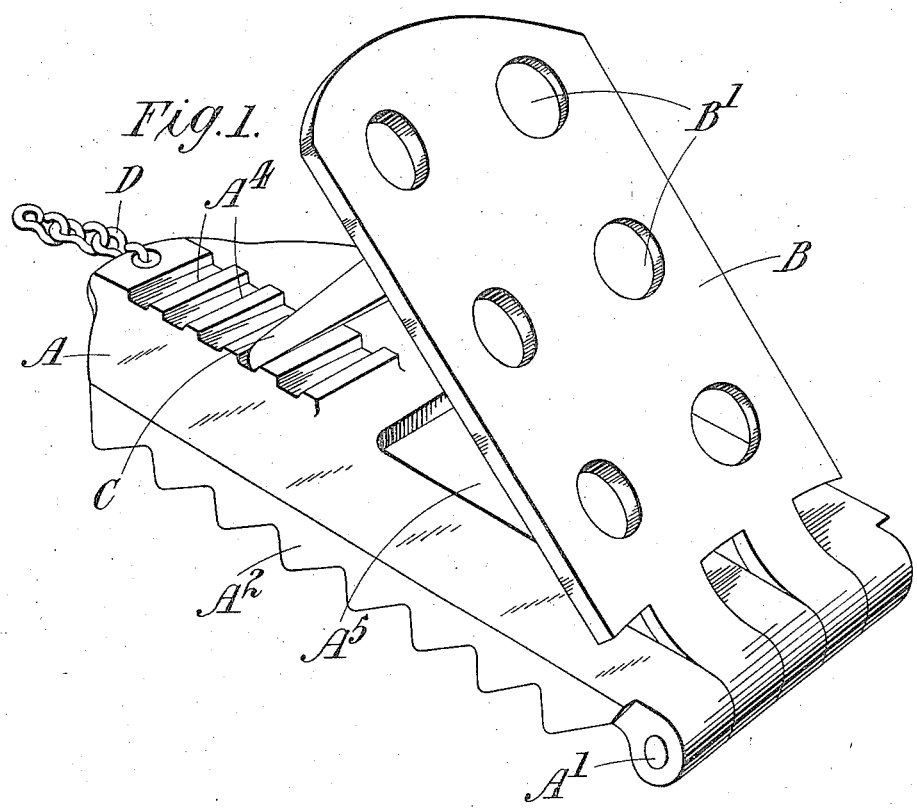

UNITED STATES PATENT OFFICE.

HERBERT FLEETWOOD HOLWORTHY, OF CHURCH STRETTON, ENGLAND.

WHEEL-SCOTCH.

1,082,807.  Specification of Letters Patent.  Patented Dec. 30, 1913.

Application filed November 9, 1912.  Serial No. 730,393.

*To all whom it may concern:*

Be it known that I, HERBERT FLEETWOOD HOLWORTHY, a subject of the King of England, residing at Church Stretton, Salop, England, have invented certain new and useful Improvements in Wheel-Scotches, of which the following is a specification.

This invention relates to scotches for the wheels of vehicles; it is applicable to various kinds of vehicles, but is particularly useful for motor vehicles to prevent slipping on a slope when a wheel is jacked up for tire changing. If a puncture to a pneumatic tire occurs on the front wheel, it is usually practicable to secure the vehicle by locking the back wheels with the hand brake which can be fixed on; when, however, the puncture occurs on one of the back wheels this cannot be done as the wheel which is jacked up must be free for turning purposes in order to allow of the tire being conveniently manipulated.

According to the present invention there is provided an improved form of wheel scotch which readily folds up, and which preferably has an angularly-adjustable wheel-engaging member, whereby the scotch may readily be adjusted to suit the particular size or form of wheel with which it is to be used.

Conveniently the scotch comprises a wheel-engaging member hinged to a base plate and adapted to be held in varying angular relation thereto by a suitable support.

For a more complete understanding of the invention, reference is directed to the accompanying drawing, which shows, by way of example, one form of scotch according to the present invention.

In this drawing Figure 1 is a perspective view of the scotch with the wheel-engaging member in working position. Fig. 2 is an under-plan view of one form of base plate, and Fig. 3 is a side elevation with part of one side flange of the base plate broken away, showing the parts folded up.

Like letters of reference refer to like parts throughout the drawings.

In the construction shown, on a base plate A there is hinged a wheel-engaging member B, a pin A' holding the two members together. The member B is preferably curved as shown in Fig. 1, the better to fit the tires or wheels in connection with which it is to be used. The base plate A is formed on its under side with side flanges $A^2$ which may be serrated or toothed as shown in the drawings to get a good grip on the ground. Toward the heel of the base plate A there may also be provided an additional gripping strip $A^3$ which also may be serrated if desired.

Hinged to the member B is a support or strut C which may conveniently be tapered as shown, and the end of which engages rack teeth $A^4$ formed on the upper face of the base plate A; thus, by changing the position of strut C in the rack teeth $A^4$ the angular relation of the members A and B may be adjusted as desired.

The plate A and member B are preferably slotted or perforated as shown at $A^5$ and B' for the sake of lightness.

When it is desired to scotch up a wheel, all that is necessary is to adjust the member B to a convenient height and then push the scotch into engagement with the wheel in the well known manner. When the scotch is not in use the member B should be folded over on to the under face of the base plate A as shown in Fig. 3 to fit between the side flanges $A^2$; the strut C should also be folded down to the base of the member B so that the parts will all lie flat and take up little room.

While one scotch as above described will be sufficient for holding the car on a slope, when the puncture takes place on the level it is difficult when pulling the tire and wheel about to avoid pushing the car off the jack, and trouble may readily arise. To prevent this the scotches may be used in pairs, one in front of the wheel and one behind it; when such a pair of scotches is used they should be connected together by a chain D or a rod or the equivalent, so that they may be kept together and one of them will not be left on the road by oversight—in other words, so that when one scotch is removed the other must also be removed. When a pair of scotches is thus employed, it is preferable to serrate the portions $A^2$ and $A^3$ on the base plate on only one scotch, which should be placed into position first. The other scotch, with unserrated strips $A^2$ and $A^3$ can then more easily be pushed into position.

For lightness it is preferred to stamp the parts out of steel, but they can be cast from aluminium or otherwise produced as desired. When folded up the scotch takes up very little room and can be easily carried in the toolbox, or it may be hung upon a hook or other support convenient for use. The size, strength, and weight of the parts may be varied to suit circumstances, as the scotch is equally useful for small or for heavy vehicles.

For application to twin tires, the scotch may be formed double, and if desired, with hollows to receive the tires; also the top plate may in any case be hollowed as well as, or without being curved to the circumference of the wheel.

The scotch may be provided with an adjustable or fixed handle by which to place it in the wheel.

Obviously the strut C and rack teeth $A^4$ may be modified as desired or be substituted by equivalent parts. For instance the strut may be hinged to the plate A and the rack teeth formed in the member B, or a pin engaging in holes may be substituted for the strut and rack teeth shown in the drawings. If desired also the base plate A may be omitted and the strut C engage directly with the ground. Other modifications may also be used, and it is to be understood that the specific construction shown in the drawings is only given by way of example and that the invention is not limited thereto.

What I claim as my invention and desire to secure by Letters Patent is:—

1. A wheel scotch comprising a base plate, a wheel engaging member pivoted to the front end thereof and arranged to be folded on the under side of the base plate when not in use, a support engaging the base plate and wheel engaging member when open for use, and means for retaining said support in position with relation to the base plate and wheel engaging member; substantially as described.

2. A wheel scotch comprising a base plate having downwardly extending hinged projections at one end thereof, a wheel engaging member pivoted to the front end of the base plate and arranged to be folded on to the bottom of the base plate, said wheel engaging member having reversely extending hinged projections, a rack on the upper face of the base plate, and a support pivoted to the wheel engaging member and arranged to engage the teeth in the rack to hold the wheel supporting member in its proper position with relation to the base; substantially as described.

3. A wheel scotch comprising a base plate having serrated flanges along its longitudinal edges and on the lower face thereof, a wheel engaging member pivoted to the front end thereof and arranged to be folded so as to lie on the bottom of the base plate between the flanges of the base plate, and a support pivoted to the wheel engaging member and arranged to engage the base to retain the wheel engaging member in proper position when the scotch is in use; substantially as described.

4. A wheel scotch comprising a base plate having serrated flanges along its longitudinal edges and on the lower face thereof, a wheel engaging member pivoted to the front end thereof, said wheel engaging member having a face for engaging the wheel when in use and arranged to be folded so as to lie on the bottom of the base plate between the flanges of the base plate, there being a rack on the base plate, and a supporting member pivoted to the wheel engaging member arranged to engage the teeth in said rack to retain the wheel supporting member in position with relation to the base plate when the scotch is in use; substantially as described.

In testimony whereof I have signed my name to this specification in the presence of two subscribing witnesses.

HERBERT FLEETWOOD HOLWORTHY.

Witnesses:
HARRY B. BRIDGES,
PERCY HEWITT.